(12) United States Patent
Mettler et al.

(10) Patent No.: US 9,145,053 B2
(45) Date of Patent: Sep. 29, 2015

(54) POWER TAKE-OFF CLUTCH ASSEMBLY

(71) Applicant: Waterous Company, So. St. Paul, MN (US)

(72) Inventors: Thomas Joseph Mettler, Hudson, WI (US); Dale James Studenski, Eagan, MN (US)

(73) Assignee: Waterous Company, South St. Paul, MN (US)

( * ) Notice: Subject to any disclaimer, the term of this patent is extended or adjusted under 35 U.S.C. 154(b) by 457 days.

(21) Appl. No.: 13/624,028

(22) Filed: Sep. 21, 2012

(65) Prior Publication Data

US 2013/0068046 A1 Mar. 21, 2013

Related U.S. Application Data

(60) Provisional application No. 61/537,158, filed on Sep. 21, 2011.

(51) Int. Cl.
*F16H 37/02* (2006.01)
*B60K 17/28* (2006.01)

(52) U.S. Cl.
CPC ............ B60K 17/28 (2013.01); *B60Y 2300/73* (2013.01); *B60Y 2400/422* (2013.01); *B60Y 2400/423* (2013.01)

(58) Field of Classification Search
CPC ................... B60Y 2300/73; B60Y 2400/422; B60K 17/28

USPC ........................................ 74/11, 15.82, 15.84
See application file for complete search history.

(56) References Cited

U.S. PATENT DOCUMENTS

| 4,825,970 | A | | 5/1989 | McVicar et al. |
| 5,058,455 | A | * | 10/1991 | Nemoto et al. ............. 74/606 R |
| 5,123,234 | A | | 6/1992 | Harada et al. |
| 5,937,697 | A | | 8/1999 | Matsufuji |
| 5,983,737 | A | * | 11/1999 | Oosterhuis et al. ............ 74/15.2 |
| 6,012,347 | A | * | 1/2000 | Hasegawa ................. 74/388 PS |
| 6,564,891 | B2 | * | 5/2003 | Ishii et al. .................... 180/53.1 |
| 6,854,541 | B2 | | 2/2005 | Matufuji et al. |
| 7,854,281 | B2 | | 12/2010 | Maezawa et al. |
| 7,938,041 | B1 | * | 5/2011 | Shiigi et al. ..................... 74/650 |
| 8,899,131 | B2 | * | 12/2014 | Keller ......................... 74/665 N |
| 2004/0211274 | A1 | * | 10/2004 | Seipold ............................ 74/11 |
| 2007/0209457 | A1 | | 9/2007 | Irikura et al. |
| 2008/0173752 | A1 | * | 7/2008 | Palcic et al. ................ 244/17.11 |
| 2010/0018336 | A1 | * | 1/2010 | Kuma et al. ..................... 74/329 |
| 2012/0042743 | A1 | * | 2/2012 | Hunold et al. .................. 74/335 |
| 2013/0036862 | A1 | * | 2/2013 | Keller ............................. 74/661 |

* cited by examiner

*Primary Examiner* — David M Fenstermacher
(74) *Attorney, Agent, or Firm* — Todd R. Fronek; Larkin Hoffman Daly & Lindgren, Ltd.

(57) ABSTRACT

A clutch assembly is provided for engaging a PTO assembly with a primary drive shaft of a vehicle engine. The clutch assembly includes a synchronizing clutch for rotating an output member and a primary clutch positionable to rotationally connect the output member to the primary drive shaft.

24 Claims, 6 Drawing Sheets

POWER TAKE-OFF CLUTCH ASSEMBLY

CROSS-REFERENCE TO RELATED APPLICATIONS

This application claims priority under 35 U.S.C. §119(e) to U.S. Provisional Patent Application Ser. No. 61/537,158 filed on Sep. 21, 2011, and incorporated herein by reference.

BACKGROUND

Vehicles such as trucks and tractors can employ a power take-off ("PTO") assembly used to power an implement such as an auxiliary attachment or separate machine. For example, a fire truck may employ a PTO assembly to power a water pump. In some instances, the PTO assembly allows the implement to draw energy or power from the vehicle's engine by employing a clutch assembly to connect/disconnect the PTO assembly with the vehicle's engine. Current clutch assemblies include split-shaft PTO assemblies, chassis transmission-mounted PTO assemblies and sandwich PTO assemblies. In a split-shaft PTO assembly, the main drive shaft of the vehicle is required to be disengaged from a rear differential in order for the PTO assembly to be engaged, which prevents a pump driven by the PTO from operating while the vehicle is in motion. In a chassis transmission-mounted PTO assembly, the PTO assembly draws power directly from the transmission, which can limit a size of pump that can be used with such a PTO assembly. Sandwich PTO assemblies can be positioned between a main engine and transmission to conserve space. However, the clutch employed is limited by size and expense in order to provide sufficient power to operate the implement.

SUMMARY

A clutch assembly is provided for engaging a PTO assembly with a primary drive shaft of a vehicle engine. The clutch assembly includes a synchronizing clutch for rotating an output member to a speed that is synchronized with the drive shaft. Once rotation of the output member and drive shaft are synchronized, a primary clutch is positionable to rotationally connect the output member to the primary drive shaft such that torque passes directly from the drive shaft, through the primary clutch and to the output member.

DETAILED DESCRIPTION

Figure 1:
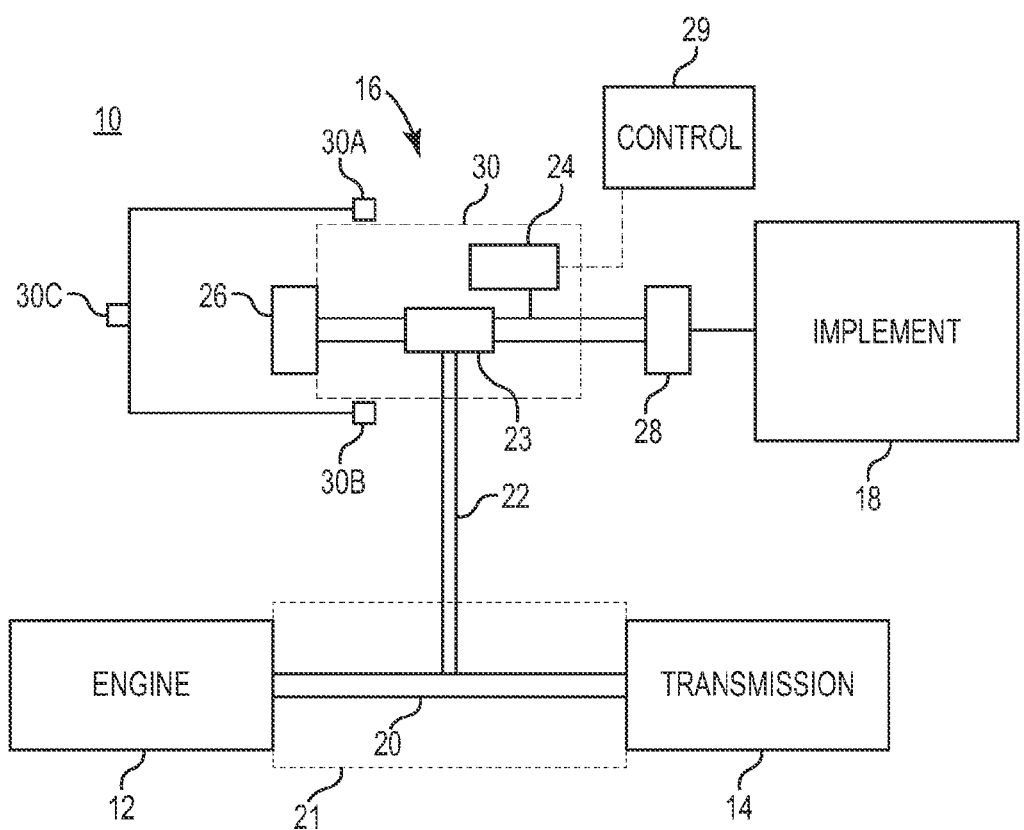
FIG. 1 is a schematic view of elements of a vehicle employing a power take-off assembly.
Figure 2:
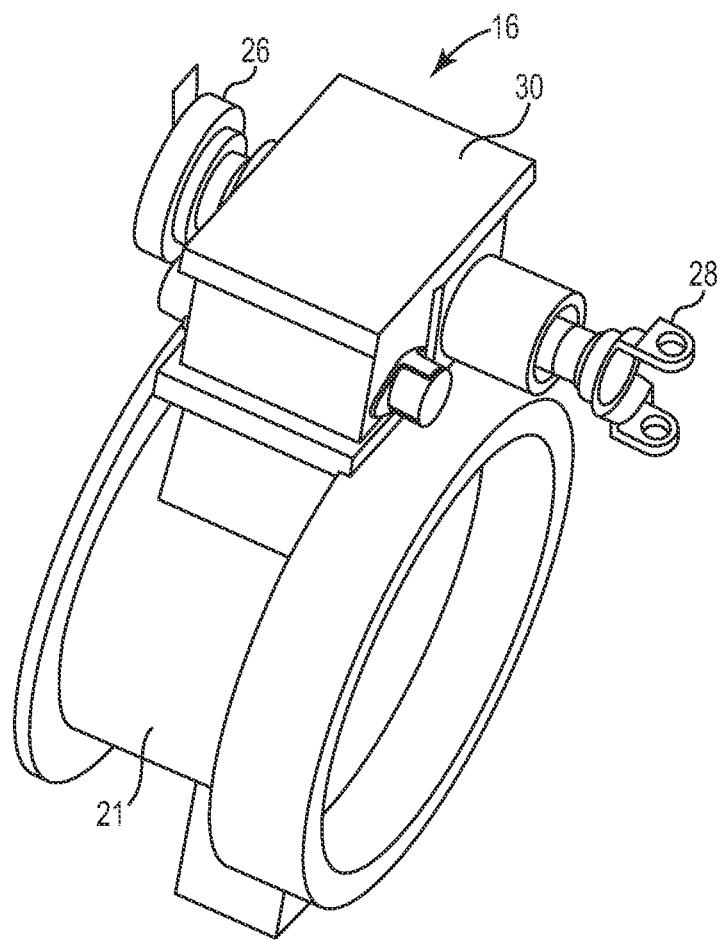
FIG. 2 is an isometric view of an exemplary power take-off assembly and drive shaft housing.
Figure 3:
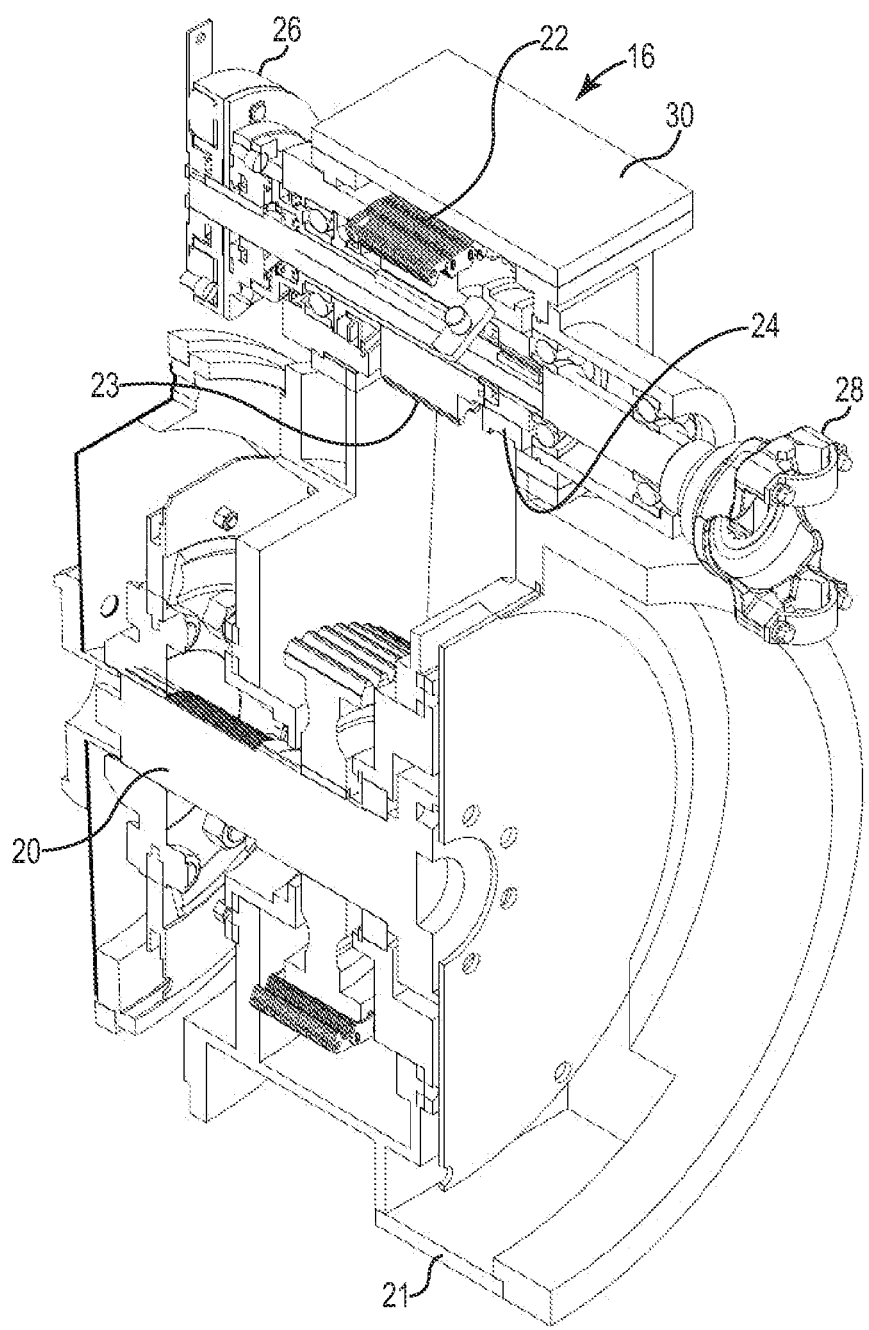
FIG. 3 is a sectional view of the exemplary power take-off assembly and drive shaft housing of FIG. 2.

FIG. 1 is a schematic view of a vehicle 10 that includes an engine 12, a transmission 14 and a power take-off (PTO) assembly 16 configured to selectively drive an implement 18. Engine 12 rotationally drives a primary drive member 20 (e.g., a drive shaft) contained within a suitable drive shaft housing 21 in order to supply power to transmission 14, which, in one embodiment, is used to drive wheels of the vehicle 10. FIGS. 2 and 3 illustrate an isometric view and sectional view of an exemplary embodiment of the PTO assembly 16 and drive shaft housing 21, respectively. PTO Assembly 16 is positioned between the engine 12 and transmission 14 (i.e., a sandwich PTO assembly) and is utilized to engage primary drive member 20 in order to drive the implement 18. In particular, the PTO assembly 16 is directly coupled to drive member 20 through a suitable connector 22 such as a belt, chain or gears. To selectively drive implement 18 with drive member 20, PTO assembly 16 includes an input member 23 coupled with the connector 22, an engagement mechanism operating as a primary clutch 24, a synchronizing clutch 26 and an output member 28.

Details of operation of elements in the PTO assembly 16 are provided below. In general, PTO assembly 16 operates to drive implement 18 through selective connection between the drive member 20 and output member 28. The primary clutch 24 is utilized to selectively rotationally connect and disconnect the output member 28 with the primary drive member 20 through the input member 23. In one embodiment, the primary clutch 24 rotationally connects the output member 28 and the primary drive member 20 while drive member 20 rotates. Engagement of the primary clutch 24 during operation of drive member 20 is known as a "hot shift". In this example, synchronizing clutch 26 is employed to provide rotation of output member 28 at a similar rotational speed to input member 23. Upon engagement of the synchronizing clutch 26, the output member 28 is rotationally "synchronized" with rotation of the input member 23.

Once engaged, the primary clutch 24 is operated to engage input member 23 to directly couple the input member 23 with the output member 28 such that torque from drive shaft 20 is transferred from the input member 23, through primary clutch 24 and to output member 28. In one embodiment, engagement of the primary clutch 24 is initiated by a suitable control element 29 coupled with the primary clutch 24. For example, control element 29 can include an actuator to selectively operate to engage primary clutch 24. For example, control 29 can monitor time, compare relative speed of input member 23 and output member 28 (e.g., engage clutch 24 when output member is rotating at 90%, 95% or 100% of a speed of input member 23) and/or monitor other elements of system 10 to determine when to initiate engagement of primary clutch 24. Once primary clutch 24 is engaged, the implement 18 can draw power directly from the engine 12 and primary drive member 20. After the output member 28 is coupled to receive torque directly from the primary drive member 20 through primary clutch 24, the synchronizing clutch 26 can be disengaged. Based on this design, synchronizing clutch 26 need not include a sufficient amount of torque capacity necessary to drive the implement 18. Instead, the synchronizing clutch 26 only is needed to rotate the output member 28 until the drive member 20 engages the output member 28 through primary clutch 24.

In order to provide lubrication to elements of PTO assembly 16, a sealed housing 30 is provided. Details of the sealed housing 30 are provided below. In general, however, housing 30 includes an inlet 30A configured to receive a lubricant (e.g., oil) such that elements of the PTO assembly 16 receive sufficient lubrication. Furthermore, the housing 30 includes a collection outlet (or sump) 30B to collect the lubricant after passing through the PTO assembly 16 and a pump 30C to return the lubricant to the inlet 30A of the housing 30. In this manner, sufficient lubrication is provided to the PTO assembly 16. Moreover, PTO assembly 16 can include a passive oil collection system coupled with pump 30C that can collect lubricant from both the outlet 30B as well as lubricant collected proximate input member 23. The collected lubricant can be pumped to an external lubricant cooler (not shown) and return to inlet 30A during operation of engine 12.

Figure 4:
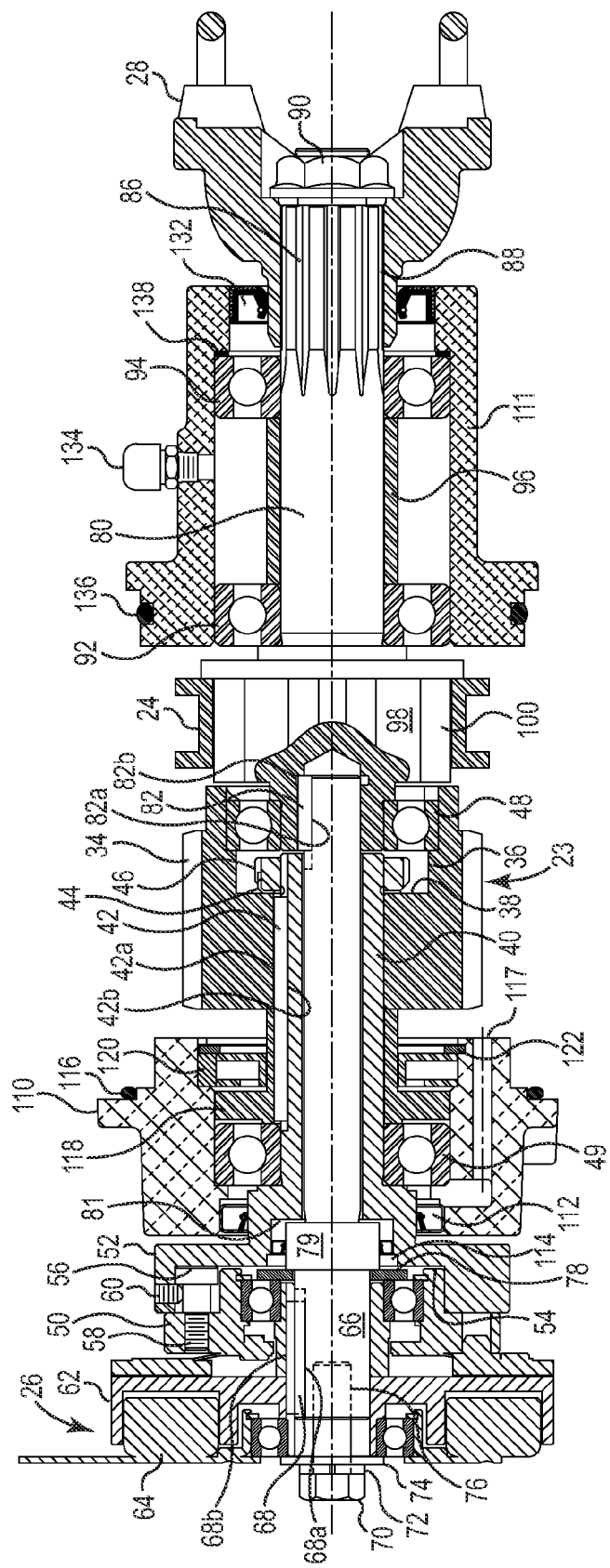
FIG. 4 is a sectional view of a power take-off clutch assembly.
Figure 5:
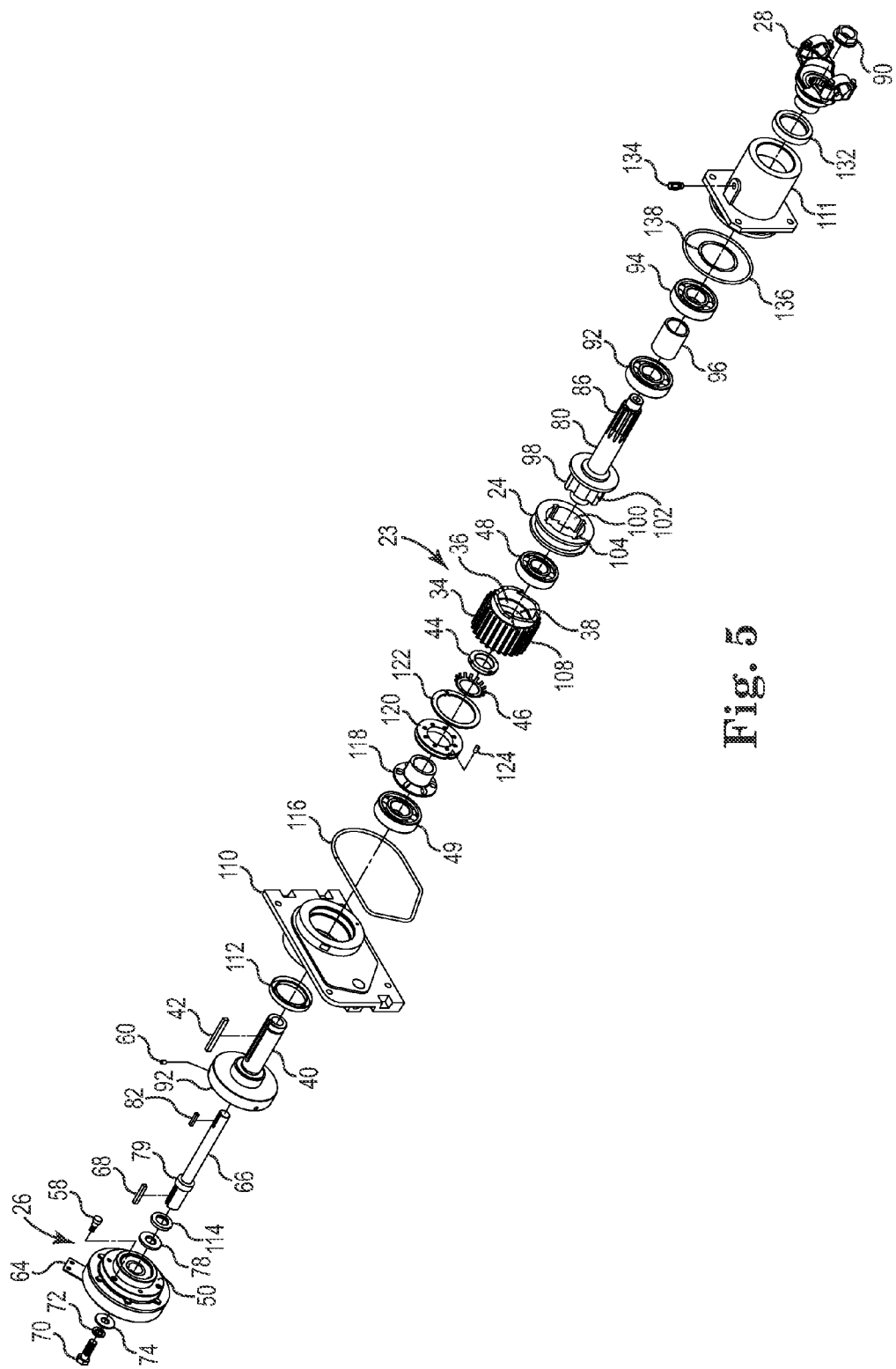
FIG. 5 is an exploded isometric view of the power take-off clutch assembly illustrated in FIG. 4.
Figure 6:
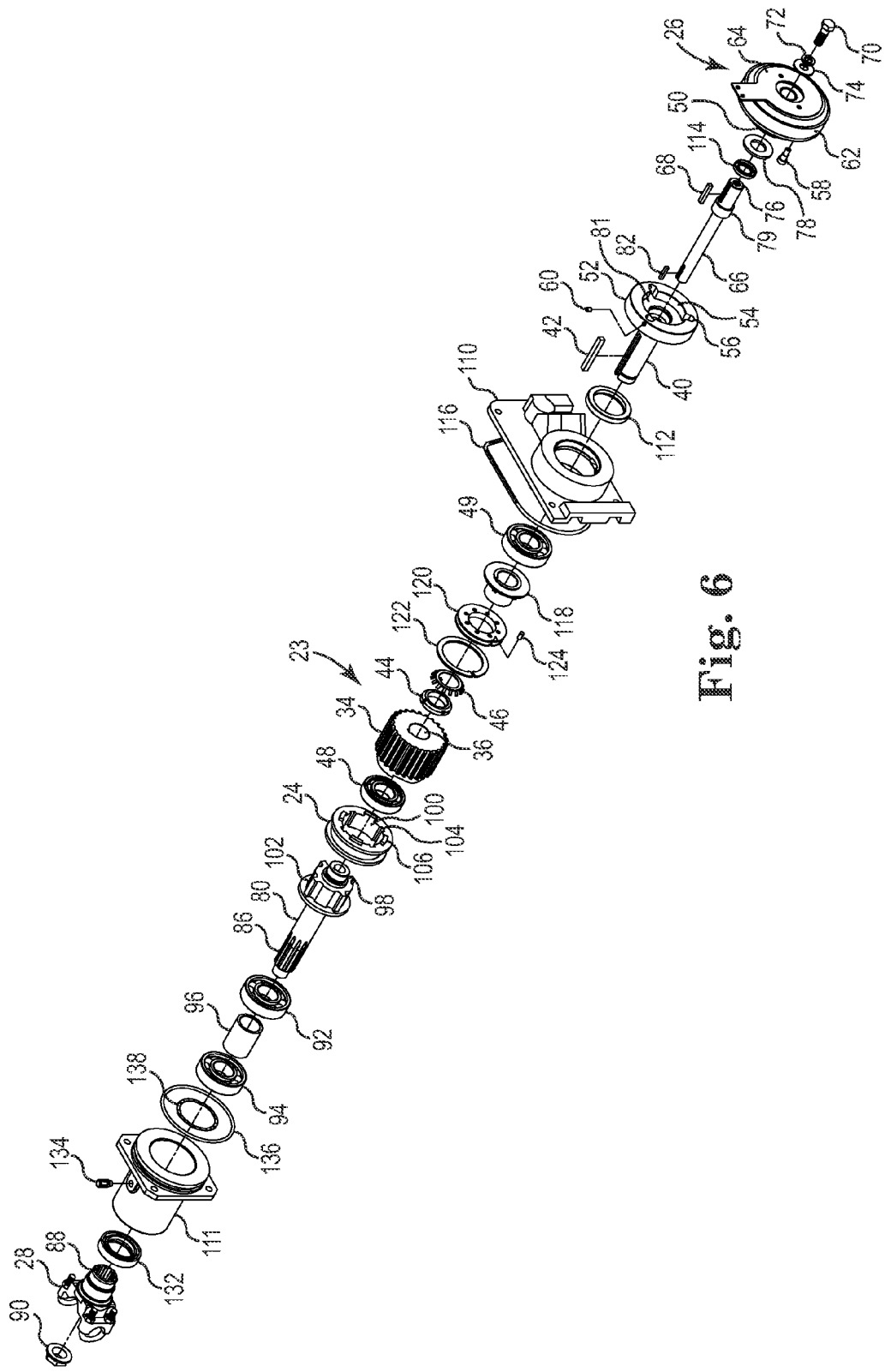
FIG. 6 is an exploded isometric view of the power take-off clutch assembly illustrated in FIG. 4 from an alternate perspective to that illustrated in FIG. 5.

As illustrated in FIGS. 4-6, PTO assembly 16 includes the input member 23, herein embodied as a sprocket 34, the primary clutch 24, herein embodied as a shift collar, the synchronizing clutch 26, herein embodied as an electromagnetic clutch and the output member 28, herein embodied as a yoke. PTO assembly 16 is directly coupled to drive member 20 (FIG. 1) through sprocket 34 coupled with connector 22 (FIG. 1). In the embodiment illustrated, sprocket 34 is a toothed wheel, wherein connector 22 is a chain that engages teeth on the sprocket 34. As such, sprocket 34 rotates together with drive member 20.

Sprocket 34 further includes a central opening 36 defining a shoulder 38. Sprocket 34 is also directly coupled to a hollow shaft 40 positioned within central opening 36 through a key 42 that directly rotationally couples the sprocket 34 and shaft 40. Key 42 is herein embodied as a square key, although other means of coupling sprocket 34 with shaft 40 can also be used such as a splined connection, a pin connection, a press fit, a polygon profile shaft coupling with a corresponding bore, threads, welds, a brazed connection, a soldered connection and an adhesive connection. In particular, sprocket 34 includes an interior recess 42a and shaft 40 includes a corresponding recess 42b to engage key 42 such that sprocket 34 and shaft 40 rotate together. A bearing lock nut 44 and bearing nut washer 46 are used to secure shaft 40 within sprocket 34 against shoulder 38. Additionally, a first ball bearing 48 and a second ball bearing 49 are provided to support rotation of shaft 40.

Shaft 40 is in turn directly coupled to an exterior hub 50 of synchronizing clutch 26. In the example shown, shaft 40 includes an enlarged end 52 defining an opening 54 that engages exterior hub 50 and extends along a length of shaft 40. In particular, opening 54 defines a plurality of recesses 56 configured to receive corresponding screws 58 mounted directly to exterior hub 50. Corresponding set screws 60 can be used to secure screws 58 within each of the recesses 56. Based on connections discussed above, connector 22, sprocket 34, shaft 40 and exterior hub 50 each are configured to rotate when drive member 20 is operating. It will be appreciated that other methods of coupling shaft 40 with hub 50 can further be used.

Synchronizing clutch 26 further includes an interior hub 62 that, when clutch 26 is engaged, rotates with the exterior hub 50. Both interior hub 50 and exterior hub 62 are coupled with a stator 64 such that both exterior hub 50 and interior hub 62 can rotate with respect to the stator 64. Stator 64 can be mounted to a portion of vehicle 10 (FIG. 1). As discussed above, synchronizing clutch 26 is an electromagnetic clutch. During operation, electricity is provided to induce a magnetic field that draws exterior hub 50 into contact with interior hub 62. Due to friction, surfaces of the exterior hub 50 and interior hub 62 that contact each other will cause exterior hub 50 and interior hub 62 to rotate together. In an alternative embodiment, clutch 26 can be of a different configuration, for example a hydraulic clutch powered by lubricant entering through casing 30 (FIG. 1). In this instance, hydraulic power would be used to bring surfaces of exterior hub 50 and interior hub 62 into contact with one another such that hub 50 and hub 62 rotate together. In yet a further embodiment, a pneumatic clutch could also be used such that pneumatic power brings surfaces of exterior hub 50 and interior hub 62 into contact with one another.

Interior hub 62 is rotationally coupled with an interior shaft 66 through a key 68. Thus, when synchronizing clutch 26 is engaged, hub 62 and shaft 66 rotate with hub 50 and shaft 40. To accommodate key 68, shaft 66 includes a recess 68a whereas interior hub 62 includes a corresponding recess 68b configured to receive the key 68. Key 68 is herein embodied as a square key, although other means of coupling hub 62 with shaft 66 can also be used such as a splined connection, a pin connection, a press fit, a polygon profile shaft coupling with a corresponding bore, threads, welds, a brazed connection, a soldered connection and an adhesive connection. In order to secure shaft 66 to interior hub 62, a bolt 70 (or other suitable fastener) passes through a lock washer 72, an exterior washer 74 and into a threaded opening 76 provided within shaft 66. An interior washer 78 is provided between a shoulder 79 of the shaft 66 and the synchronizing clutch 26.

Shaft 66 is sized to pass through opening 54 of shaft 40 and through opening 36 of sprocket 34 to engage an output shaft 80 positioned on an opposite side of sprocket 34 toward primary clutch 24. As such, shaft 66 is coaxial with the shaft 40, as is shaft 80. A key 82 is provided to couple shaft 66 with output shaft 80. In particular, shaft 66 includes a recess 82a whereas output shaft 80 includes a corresponding recess 82b that receives the key 82. Key 82 is herein embodied as a square key, although other means of coupling shaft 66 with shaft 80 can also be used such as a splined connection, a pin connection, a press fit, a polygon profile shaft coupling with a corresponding bore threads, welds, a brazed connection, a soldered connection and an adhesive connection. Shaft 80 also includes a splined end 86 configured to engage interior splines 88 of yoke 28. A nut 90 or other suitable fastener is provided to secure yoke 28 to shaft 80.

Shaft 80 is supported by a pair of bearings 92 and 94 separated by a spacer 96. On an opposite end of splined end 86, shaft 80 includes a hub 98 configured to engage an interior surface 100 of primary clutch 24. In particular, hub 98 includes a plurality of projections 102 that engage corresponding recesses 104 on interior surface 100 of primary clutch 24. As such, shaft 80 is configured to rotate with primary clutch 24. In order for shaft 80 to rotate with sprocket 34, and thus with drive member 20 (FIG. 1), a plurality of projections or dogs 106 are configured to engage corresponding projections or dogs 108 provided on sprocket 34. When shaft 80 is rotating at a speed simultaneous to sprocket 34 upon engagement of synchronizing clutch 26, primary clutch 24 can be positioned such that dogs 106 on primary clutch 24 engage dogs 108 on sprocket 34. Upon engagement, shaft 80 and output member 28 will rotate with sprocket 34 and synchronizing clutch 26 can be disengaged. In one example embodiment, primary clutch 24 is coupled to an actuator mechanism such as an air solenoid valve that operates to position primary clutch 24 into engagement with sprocket 36. Further still, the valve can be coupled with an operator switch that engages synchronizing clutch 26 and automatically shifts primary clutch 24 after output member 28 is synchronized with rotation of sprocket 34.

Based on the above configuration, primary clutch 24 is positionable between a first position, wherein clutch 24 is spaced apart from the sprocket 34 (wherein sprocket 34 rotates independent of clutch 24), and a second position, wherein the clutch 24 engages the sprocket 34 (wherein sprocket 34 and clutch 24 rotate together). In the first position, rotation of the output member 28 is based on engagement of the synchronizing clutch 26. Thus, when primary drive shaft 20 is rotating and the synchronizing clutch 26 is engaged, output member 28 will rotate from torque transmitted through sprocket 34, shaft 40, synchronizing clutch 26 and shaft 66 while the primary clutch 24 is in the first position. When the primary clutch 24 is in the first position and the synchronizing clutch 26 is not engaged, output member 28 will not rotate. Conversely, when primary clutch 24 is in the second position, torque is directly transferred from sprocket 34, through clutch 24 and to output member 28.

In one embodiment and as discussed above, PTO assembly 16 can be encased, sealed and lubricated within a housing 30 (FIG. 1) to provide lubrication and/or cooling to elements within the PTO assembly 16. To seal elements of PTO assembly 16, a first housing portion 110 is positioned to surround shaft 40 and a second housing portion 111 is positioned to surround shaft 80. An external casing (shown in FIG. 2) extends between the first housing portion 110 and the second housing portion 111. A first oil seal 112 and a second oil seal 114 are provided to seal oil housing portion 110 against shaft 40 and shaft 66, respectively. The seals 112 and 114 prevent lubricant from exiting the PTO assembly 16 through housing portion 110. Furthermore, an o-ring 116 is provided to seal against oil housing portion 110 and the external casing.

Lubricant is provided to sprocket 34 through an entry port in the oil housing 30 (FIG. 1). An oil impeller 118 is rotatably coupled with shaft 40 through connection with key 42. Additionally, an oil concentrator 120 restrained within the housing 110 with a retaining ring 122. Lubricant from sprocket 34 can pass through oil concentrator 120 to impeller 118, where lubricant is pumped with fins on the impeller out of housing portion 110 to the pump 30C (FIG. 1). Lubricant that passes from the impeller 118 through bearing 49 is permitted to drain back within the housing 30 (for example to a housing sump 30B) through passageway 117 (FIG. 4). Optionally, a pin 124 is provided to orient the oil concentrator 120 and retaining ring 122. At an opposite end of the sealed casing, housing portion 111 surrounds the output shaft 80. The housing portion 111 is sealed with a seal 132 provided between yoke 28 and the housing portion 111. An oil breather 134 can be provided to provide relief to pressure within the housing 30. An o-ring 136 further provides a seal between the housing portion 111 and the casing. In addition, a wave spring 138 biases bearing 94 away from an interior of housing portion 111.

Although the present invention has been described with reference to preferred embodiments, workers skilled in the art will recognize that changes can be made in form and detail without departing from the spirit and scope of the present invention.

What is claimed is:

1. A power take-off clutch assembly, comprising:
a synchronizing clutch having a first hub and a second hub;
an input member coupled to the first hub of the synchronizing clutch;
an output member coupled to the second hub of the synchronizing clutch; and
a primary clutch positionable between a first position and a second position with respect to the input member such that, in the first position, the output member rotates based on torque transmitted between the first hub and the second hub of the synchronizing clutch and, in the second position, the output member rotates based on torque transmitted from the input member through the primary clutch.

2. The assembly of claim 1, wherein the primary clutch is a collar slidably positioned with respect to the input member.

3. The assembly of claim 1, wherein the input member comprises a sprocket.

4. The assembly of claim 1, wherein the input member is coupled to the first hub through a hollow shaft and wherein the output member is coupled to the second hub through an inner shaft coaxial with the hollow shaft.

5. The assembly of claim 1, wherein in the first position, the primary clutch is spaced apart from the input member and, in the second position, the primary clutch directly engages the input member.

6. The assembly of claim 1, wherein the synchronizing clutch is an electromagnetic clutch.

7. The assembly of claim 1, wherein along an axis of rotation of the output member, the input member is positioned between the synchronizing clutch and the output member.

8. The assembly of claim 1, further comprising an impeller rotationally coupled with the input member and configured to pump lubricant away from the input member.

9. A method, comprising:
rotating an input member through connection with a drive shaft spaced apart from the input member;
engaging a synchronizing clutch coupled to the input member to rotate an output member;
moving a primary clutch from a first position to a second position during rotation of the input member and while the synchronizing clutch is engaged, wherein the output member rotates based on torque generated through the synchronizing clutch while the primary clutch is in the first position and wherein the output member rotates based on torque generated through the primary clutch while the primary clutch is in the second position.

10. The method of claim 9, wherein the primary clutch is a collar slidably positioned with respect to the input member.

11. The method of claim 9, wherein the input member comprises a sprocket.

12. The method of claim 9, wherein the input member is coupled to the first hub through a hollow shaft and wherein the output member is coupled to the second hub through an inner shaft coaxial with the hollow shaft.

13. The method of claim 9, wherein in the first position, the primary clutch is spaced apart from the input member and, in the second position, the primary clutch directly engages the input member.

14. The method of claim 9, wherein the synchronizing clutch is an electromagnetic clutch.

15. The method of claim 9, wherein along an axis of rotation of the output member, the input member is positioned between the synchronizing clutch and the output member.

16. The method of claim 9, further comprising disengaging the synchronizing clutch after the primary clutch has moved to the second position.

17. A vehicle, comprising:
an engine;
a primary drive shaft coupled to the engine and a transmission spaced apart from the engine;
a power take-off assembly coupled to the primary drive shaft and positioned between the engine and the transmission, comprising:
an input member, an output member, a synchronizing clutch and a primary clutch, the primary clutch operable in a first position, wherein rotation of the output member is based on engagement of the synchronizing clutch, and a second position, wherein torque is transmitted from the input member, through the primary clutch to the output member.

18. The vehicle of claim 17, wherein the primary clutch is a collar slidably positioned with respect to the input member.

19. The vehicle of claim 17, wherein the input member comprises a sprocket.

20. The vehicle of claim 17, wherein the input member is coupled to the first hub through a hollow shaft and wherein the output member is coupled to the second hub through an inner shaft coaxial with the hollow shaft.

21. The vehicle of claim 17, wherein in the first position, the primary clutch is spaced apart from the input member and, in the second position, the primary clutch directly engages the input member.

22. The vehicle of claim 17, wherein the synchronizing clutch is an electromagnetic clutch.

23. The vehicle of claim 17, wherein along an axis of rotation of the output member, the input member is positioned between the synchronizing clutch and the output member.

24. The vehicle of claim 17, further comprising a housing surrounding the power-take off assembly and an impeller rotationally coupled with the input member and configured to pump lubricant away from the input member to a position external the housing.

* * * * *